Feb. 11, 1947.　　　　M. MALLORY　　　　2,415,507
INTERNAL-COMBUSTION ENGINE
Filed Feb. 7, 1945

INVENTOR.
Marion Mallory
BY
Barnes, Kisselle, Laughlin & Raisch
Attorneys

Patented Feb. 11, 1947

2,415,507

UNITED STATES PATENT OFFICE 2,415,507

INTERNAL-COMBUSTION ENGINE

Marion Mallory, Detroit, Mich.

Application February 7, 1945, Serial No. 576,588

9 Claims. (Cl. 123—53)

This invention relates to an internal combustion engine.

It is an object of the invention to produce an engine which can breathe freely, i. e., to reduce the resistance of the intake charge into the cylinder and the resistance of the exhaust charge out of the cylinder.

Another object is to provide a compact engine with a greater number of cubic inch displacement for the engine space required than the enormous space used in the conventional engine.

A still further object is to produce an engine capable of operating with high efficiency at very high compression without detonation. This object is achieved by having a stratified charge and a long combustion chamber, one end, which will be the hot end of the chamber, having the ignition plug and exhaust valve and the other end having the intake valve and an additional valve for admitting air on the compression stroke to force the combustible mixture back into the hot end of the combustion chamber to prevent detonation or explosion caused by the burning charge in one part of the cylinder raising the charge to such a high pressure in the other part of the cylinder that ignition takes place before the flame reaches it.

In the ordinary engine an exhaust and intake valve are used in one cylinder and it is necessary to keep these valves in a small space to maintain high compression. In other words, if the combustion chamber area is increased much larger than the cylinder area to provide for large valves (so the engine can breathe freely) too much space is necessary in the combustion chamber to accommodate the large valves, and then it is impossible to obtain high compression. Whereas, if one valve is used in a cylinder, the circumference can be large without increasing the combustion chamber area to a larger diameter than the cylinder diameter.

In my engine I use two cylinders having the exhaust valve in one cylinder and the intake valve in the other. This keeps both valves within the diameter of the cylinder and makes possible the use of a very large valve which causes the engine cylinder to charge and exhaust very freely. In addition to the free breathing in my engine, I provide means to admit additional air charge to what is drawn in through the main intake valve. This additional air charge is used to keep one end of the combustion chamber cool and to force the combustible mixtures back into the zone where the exhaust valve and ignition plug are located, or back into the hot end of the combustion chamber. This causes combustion to start easily because the mixture is in a hot zone where it starts to burn but, as the burning or flame moves from the hot end of the combustion chamber toward the cool end, there will be no combustion taking place in front of the flame due to the pressure rise in front of the flame raising the temperature to the combustion point. Although the pressure is raised in front of the flame, the charge is leaner and cooler which prevents self-ignition even though the pressure is high. To make this more clear, a much higher pressure is necessary to cause combustion of a cool charge than a hot charge, so by keeping one end of the combustion chamber cool, the end in the direction which the flame is moving, I prevent explosion of the charge or delay it until the flame reaches it. This causes smoother burning of the charge making possible much higher compression than ordinarily can be used.

In my engine there is also a short blast of cool air admitted to the combustion chamber near the end of the exhaust stroke just preceding the closing of the exhaust valve; the exhaust valve being located at the extreme end of the cylinder from where the air is admitted and the design of the combustion chamber being in the form of a tunnel puts the exhaust valve directly in series with the incoming air charge as far as area is concerned, that is, area of the combustion chamber. This cools the exhaust valve and wipes all of the burnt gases out of the combustion chamber. The air valve also opens at a time during compression when the compression in the cylinder is at a lower pressure than the pressure in the source of the air charge. In other words, the air valve opens and closes long before the pistons have reached the end of their compression stroke or long before the pressure in the combustion chamber reaches a point higher than the air-charging pressure.

Figure 1:
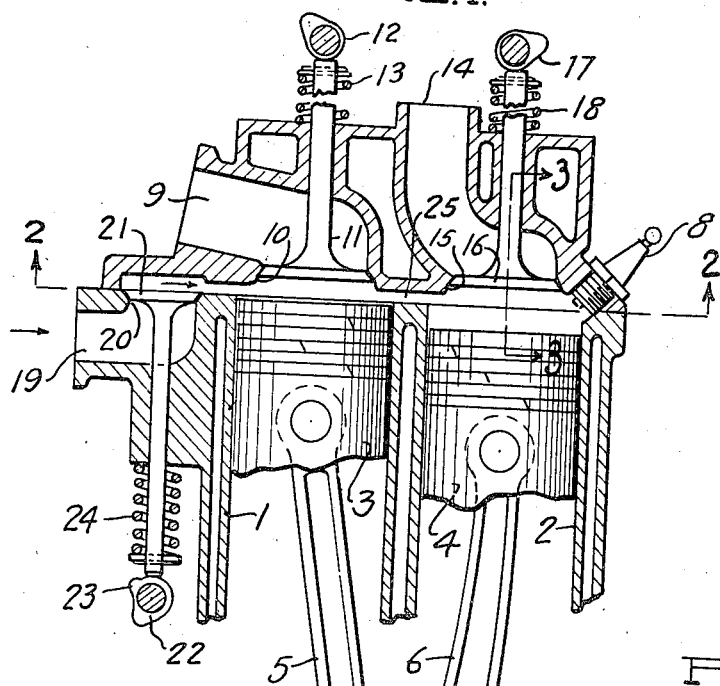
Fig. 1 is a vertical section of my engine.
Figure 3:
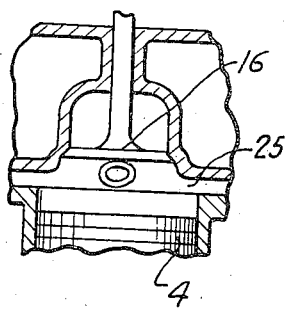
Fig. 3 is a section along the line 3—3 of Fig. 1.
Figure 2:
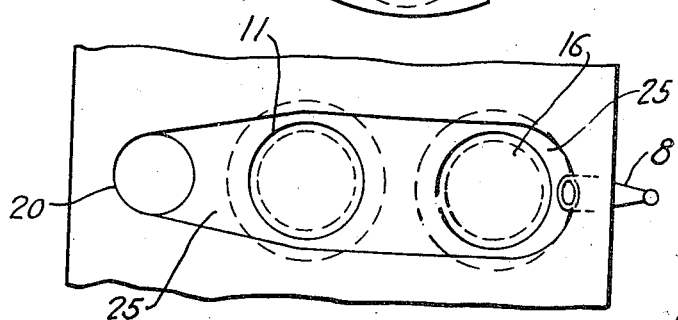
Fig. 2 is a section along the line 2—2 of Fig. 1.

The parts of my engine are as follows: Cylinders 1, 2, pistons 3, 4, connecting rods 5, 6, crankshaft 7, spark plug 8, intake passageway 9, intake port 10, intake valve 11, intake valve cam 12, valve spring 13, exhaust passageway 14, exhaust port 15, exhaust valve 16, exhaust valve cam 17, valve spring 18, air intake passageway 19 connected to a source of air under compression (not shown), air intake port 20, air valve 21, air valve cams 22, 23, valve spring 24, combustion chamber 25. It should be noted that the combustion chamber 25 extends across the heads of the cylinders 1 and 2 and takes the form of an elongated channel or tunnel 25. Intake passageway 9 is connected to a carburetor (not shown).

The operation of the engine is as follows: The engine, as shown in Fig. 1, is now in explosion position. The mixture is richer over piston 4 than over piston 3. Ignition takes place at the spark plug 8 and the burning starts to move to the left toward the cool end of the combustion chamber and toward a point that the mixture gets leaner. The pistons are driven downwardly. Upon the return stroke, cam 23 lifts valve 21 momentarily just preceding the closing of the exhaust valve 16. The cool scavenging air passing through the elongated combustion chamber 25 cools it down, wipes out the burnt charge, as well as cools the exhaust valve. The pistons 3 and 4 again start down on the suction or charge stroke. Intake valve 11 opens admitting a carburetted charge. This tends to cool the combustion chamber in the area over piston 3. As the pistons 3 and 4 start back on the compression stroke, cam 22 opens valve 21 forcing the mixture that was drawn in through intake valve on the charge or suction stroke back into the hot end of the combustion chamber in and around spark plug 8 and exhaust valve 16. The cycle is completed and explosion again takes place.

It is understood that throttle valves can be used in both passageways 9 and 19 to throttle the charge simultaneously or only one throttle valve may be used in passageway 9 to throttle the carburetted charge only. Pistons 3 and 4 reciprocate up and down substantially in unison with piston 4 having a slight lead over piston 3. This slight leading of piston 4 over piston 3 is desirable but not necessary.

The pressure of the compressed air in passageway 19 is less than the maximum compression pressures of the fuel-air mixture created by the pistons on their compression stroke. Valve 21 preferably closes when the compression pressure and the air charging pressure balance. As a practical matter, valve 21 may close when the pistons are about 100° before top dead center.

Although the use of a compressed air charge is preferred, I can omit passageway 19, valve 21, port 20 and the compressed air charge and my engine will still have an appreciable advantage over prior engines due to the fact that large valve controlled intake and exhaust ports permit free breathing of the engine and the use of a relatively small combustion space with high compression.

I claim:

1. An engine comprising two cylinders, reciprocating pistons therein, a common combustion chamber connecting the heads of said cylinders, a valve controlled intake port for passing a fuel mixture into the one cylinder, a valve controlled exhaust port for the other cylinder, electric ignition means in the combustion chamber over the cylinder having the exhaust port, a valve controlled port for air under compression positioned in the end of the combustion chamber remote from the electric ignition means, the said pistons reciprocating substantially in unison, and means for opening the compressed air port during the compression stroke of the pistons for admitting a charge of air under pressure into the combustion chamber which has previously received a carburetted fuel mixture on the intake stroke, the said air charge forcing the fuel mixture toward the end of the combustion chamber having the electric ignition means, the said mixture being leanest adjacent the compressed air port whereby upon ignition the flame travels from the rich toward the lean mixture area.

2. An engine comprising two cylinders in juxtaposition, a reciprocating piston in each cylinder, means for reciprocating said pistons substantially in unison, a combustion chamber extending across the heads of said cylinders in the form of an elongated channel, a relatively large intake port positioned over the one cylinder through which a carburetted mixture is supplied to said combustion chamber on the intake stroke, a valve controlling said intake port, a relatively large exhaust port positioned over the other cylinder through which the products of combustion are exhausted, a valve controlling said exhaust port, electric ignition means positioned at one end of the combustion chamber, a compressed air port positioned at the other end of the chamber, the said intake and exhaust ports being positioned between the said compressed air inlet port and the electric ignition means with the exhaust port adjacent the electric ignition means and the intake port adjacent the compressed air port, a valve controlling said compressed air port, and means for opening the valve for the compressed air port during the compression stroke of said pistons and for closing the same before the compression pressures in the cylinders exceeds the compression pressures of the air coming through the air port whereby the compressed air charge tends to concentrate the rich fuel mixture at the end of the combustion chamber adjacent the electric ignition means whereby upon ignition the flame travels from the rich mixture area adjacent the electric ignition means toward the lean mixture area adjacent the compressed air inlet port without detonation.

3. The combination as set forth in claim 2 including means for momentarily opening said compressed air valve during the exhaust strokes of the pistons to admit a charge of compressed air into the combustion chamber which cools the combustion chamber and intake and exhaust valves and scavenges the burnt gases from the combustion chamber out through the exhaust port.

4. An engine comprising two cylinders in juxtaposition, a reciprocating piston in each cylinder, a common crankshaft, and connecting rods connecting said pistons to the same throw of the crankshaft, a combustion chamber extending across the heads of said cylinders in the form of an elongated channel, a relatively large intake port positioned over the one cylinder through which a carburetted mixture is supplied to said combustion chamber on the intake stroke, a relatively large exhaust port positioned over the other cylinder through which the products of combustion are exhausted, a valve controlling said exhaust port, electric ignition means positioned at one end of the combustion chamber, a compressed air port positioned at the other end of the chamber, the said intake and exhaust ports being positioned between the said compressed air inlet port and the electric ignition means with the exhaust port adjacent the electric ignition means and the intake port adjacent the compressed air port, a valve controlling said compressed air port, and means for opening the valve for the compressed air port during the compression stroke of said pistons and for closing the same before the compression pressures in the cylinders exceeds the compression pressures of the air coming through the air port whereby the compressed air charge tends to concentrate the rich fuel mixture at the end of the combustion chamber adjacent the electric ignition means whereby upon ignition the flame travels from the rich mixture area adjacent the electric ignition means toward the lean mixture area adjacent the compressed air inlet port without detonation.

5. An engine comprising two cylinders, reciprocating pistons therein, a common combustion chamber connecting the heads of said cylinders, said combustion chamber taking the form of an elongated channel extending across the upper ends of said cylinders and having a width less than the diameter of said cylinders, a valve controlled intake port for passing a fuel mixture into the one cylinder, a valve controlled exhaust port for the other cylinder, electric ignition means in the combustion chamber over the cylinder having the exhaust port, a valve controlled port for air under compression positioned in the end of the combustion chamber remote from the electric ignition means, the said pistons reciprocating substantially in unison, and means for opening the compressed air port during the compression stroke of the pistons for admitting a charge of air under pressure into the combustion chamber which has previously received a carburetted fuel mixture on the intake stroke, the said air charge forcing the fuel mixture toward the end of the combustion chamber having the electric ignition means, the said mixture being leanest adjacent the compressed air port whereby upon ignition the flame travels from the rich toward the lean mixture area.

6. The combination as set forth in claim 5 wherein the compressed air port, the intake port, the exhaust port and the electric ignition means are positioned in series along the combustion chamber in the respective order mentioned.

7. An engine comprising two cylinders in juxtaposition, a reciprocating piston in each cylinder, the said pistons reciprocating substantially in unison, a common combustion chamber connecting the heads of said cylinders, a valve controlled intake port for passing a fuel mixture into the combustion chamber, a valve controlled exhaust port for said combustion chamber, the said intake port being positioned over one of the said cylinders and the exhaust port positioned over the other of said cylinders, the said ports having a diameter greater than one-half the diameter of its respective cylinder whereby the intake charge for both cylinders can be drawn freely through the intake port and the burned gases of combustion from both cylinders discharged freely out of the exhaust port, and electric ignition means positioned adjacent one end of the combustion chamber remote from the intake port and on the side of the exhaust port remote from the intake port.

8. An engine comprising two cylinders in juxtaposition, a reciprocating piston in each cylinder, means for reciprocating said pistons substantially in unison, a common combustion chamber extending across the heads of said cylinders in the form of an elongated channel, a relatively large intake port positioned over the one cylinder through which a carburetted mixture is supplied to said combustion chamber on the intake stroke, a relatively large exhaust port positioned over the other cylinder through which the products of combustion are exhausted, the diameters of said intake and exhaust ports each being sufficiently large so that only one port can be positioned above a cylinder and within the circumference of such cylinder whereby the engine can breathe freely on the intake and exhaust strokes.

9. The combination as set forth in claim 8 including an electrical igniter positioned at the end of the combustion chamber remote from the intake port.

MARION MALLORY.

REFERENCES CITED

The following references are of record in the file of this patent:

UNITED STATES PATENTS

| Number | Name | Date |
|---|---|---|
| 982,251 | Coffee | Jan. 24, 1911 |
| 1,741,730 | Newton | Dec. 31, 1929 |

FOREIGN PATENTS

| Number | Country | Date |
|---|---|---|
| 418,764 | British | 1934 |
| 221,212 | British | 1925 |
| 102,004 | British | 1916 |